(12) United States Patent
Singhal

(10) Patent No.: US 7,111,777 B2
(45) Date of Patent: Sep. 26, 2006

(54) UNIVERSAL CHARITY CARD SYSTEM

(76) Inventor: Tara C Singhal, P.O. Box 5075, Torrance, CA (US) 90510

( * ) Notice: Subject to any disclaimer, the term of this patent is extended or adjusted under 35 U.S.C. 154(b) by 602 days.

(21) Appl. No.: 09/196,963

(22) Filed: Nov. 20, 1998

(65) Prior Publication Data

US 2002/0008146 A1     Jan. 24, 2002

(51) Int. Cl.
*G06K 5/00*      (2006.01)
(52) U.S. Cl. ...................... 235/380; 235/381
(58) Field of Classification Search ................ 235/380, 235/375, 379, 385; 705/14, 16
See application file for complete search history.

(56) References Cited

U.S. PATENT DOCUMENTS

| 5,056,019 | A |   | 10/1991 | Schultz et al. |
|---|---|---|---|---|
| 5,117,355 | A |   | 5/1992 | McCarthy |
| 5,287,268 | A | * | 2/1994 | McCarthy .................. 364/405 |
| 5,297,026 | A |   | 3/1994 | Hoffman |
| 5,380,991 | A |   | 1/1995 | Valencia et al. |
| 5,466,919 | A |   | 11/1995 | Hovakimian |
| 5,506,393 | A |   | 4/1996 | Ziarno |
| 5,537,314 | A | * | 7/1996 | Kanter ......................... 705/14 |
| 5,546,303 | A |   | 8/1996 | Helbling |
| 5,555,497 | A |   | 9/1996 | Helbling |
| 5,621,640 | A |   | 4/1997 | Burke |
| 5,665,952 | A |   | 9/1997 | Ziarno |
| 5,696,366 | A |   | 12/1997 | Ziarno |
| 5,724,518 | A |   | 3/1998 | Helbling |
| 5,745,706 | A | * | 4/1998 | Wolfberg et al. ........... 395/235 |
| 5,787,404 | A | * | 7/1998 | Fernandez-Holmann ..... 705/35 |
| 5,806,045 | A |   | 9/1998 | Biorge et al. |
| 5,822,735 | A |   | 10/1998 | De lapa et al. |
| 5,991,736 | A | * | 11/1999 | Ferguson et al. ............. 705/14 |
| 6,112,191 | A | * | 8/2000 | Burke ......................... 705/41 |
| 6,128,599 | A | * | 10/2000 | Walker et al. ................ 705/14 |

FOREIGN PATENT DOCUMENTS

| AU | 676819 | * | 3/1997 |
|---|---|---|---|
| EP | 0623235 | * | 4/1997 |
| WO | 93/144476 | * | 7/1993 |

* cited by examiner

*Primary Examiner*—Daniel StCyr
(74) *Attorney, Agent, or Firm*—Steve Roeder

(57) ABSTRACT

A universal charity card system having a universal charity card which identifies a customer-benefactor and a charity by coded information. A merchant computer system which reads the universal charity card's coded information and computes charitable contribution as a percent of sales to the customer-benefactor and stores in a merchant database data on the customer-benefactor identification, the charity identification, merchant identification and charitable contribution. A central computer system which pre-stores merchant's bank electronic fund transfer identification, charity's bank electronic fund transfer identification, and links to the merchant computer system for the purpose of downloading the merchant database, whereby, it downloads the merchant database and initiates a debit electronic fund transfer to the merchant's bank for an amount equal to the charitable contribution and a credit electronic fund transfer to charity's bank for an amount equal to the charitable contribution.

30 Claims, 5 Drawing Sheets

FIGURE 3A

```
UCCS Merchant database
(Merchant Identification, Calender year)

customer-benefactor1 identification
charity1 id, split(50), cum_contribution1
charity2 id, split(50), cum_contribution2 customer-benefactor2 identification
charity1 id, split(50), cum_contribution1
charity2 id, split(25), cum_contribution2
charity3 id, split(25), cum_contribution3
   ...
   ...
customer-benefactor-n identification
charity id, split(100), cum_contribution
```

FIGURE 4A

```
UCCS Central Computer database
Charity1     total contribution
Merchant1    total contribution
             benefactor1, contribution
             benefactor2   contribution
                ....
                ....
Merchant2    total contribution
             benefactor1   contribution
             benefactor2   contribution
                ......
                ......
Charity2     total contribution
Merchant1    total contribution
             benefactor1, contribution
             benefactor2   contribution
                ....
                ....
Merchant2    total contribution
             benefactor1   contribution
             benefactor2   contribution
                ......
                ......
```

UNIVERSAL CHARITY CARD SYSTEM

BACKGROUND

Merchants, as part of their business strategy of keeping customers and fostering customer loyalty, make contributions to local charities based on the specific needs of their customers as a percentage of sales to those customers. This charitable contribution is made possible by the merchant selling to the charity bearer certificates for redemption at the merchant's store for the merchant's goods. These bearer certificates are sold at a discount from the face value to the charity. The charity in turn sells those bearer certificates to its benefactors at full face value. The benefactors then use the bearer certificates at that specific merchant that issued the certificates.

This approach to raising charitable funds involves fund raisers' effort and has effort and inconveniences on the part of others built into it. For example, the benefactors have to buy these bearer certificates in bulk by paying cash to the charity and thus laying out funds in advance. The charity acts as a middle man and has to find and convince benefactors to buy these certificates to help the charity. The merchant has to print the bearer charity certificates and track them from selling to charity to until they are cashed by the benefactor.

An objective of the present invention is to eliminate the charity's role as a middle man in buying certificates from the merchant and selling them to the benefactor.

Another objective is to eliminate a benefactor's need to buy the certificates in advance and shell out large cash in advance.

Yet another objective is to eliminate the merchant's effort in having to print, sell and redeem and thus track the certificates.

Yet another objective is to enable those charities that do not participate in this approach of fund raising to participate in this approach by eliminating the effort on the charity's part of buying and selling charity certificates of a merchant.

Yet another objective is to achieve substantial reduction in effort and cost for the benefactor, the charity and the merchant by automating the system at the local and national level.

SUMMARY

A Universal Charity Card System (UCCS) is described. In UCCS, there is a Universal Charity Card (UCC) which identifies a customer-benefactor and a charity by coded identification. The customer-benefactor is a customer of a merchant and benefactor of the charity. The coded identification may use magnetic encoding means or bar-coding means. If bar-code is used, it is preferable, that the customer-benefactor identification code is on one side of the card and the charity identification code is on the other side of the card.

The UCCS has a merchant computer system of the merchant. This may be an existing computer system used by the merchant for other tasks such as sales/receipt system in which a UCCS merchant software system is built into. The merchant computer system reads the Universal Charity Card's coded identification information via an input peripheral.

The UCCS merchant software has an interface function to merchant's sales/receipt system transferring coded identification data from the UCC and current total sale to the UCCS merchant software. It also has a function of computing cumulative charitable contribution equal to prior charitable contribution plus a percent of current sale and a function of printing charity name and cumulative charitable contribution on the current sales receipt.

The UCCS merchant software system also has data storage means in a UCCS merchant database which stores data on the customer-benefactor identification, the charity identification, merchant identification and charitable contribution.

The UCCS may preferably also have a UCCS central computer system which pre-stores the merchant's bank electronic fund transfer identification and the charity's bank electronic fund transfer identification. The UCCS central computer system links to the merchant computer system for downloading the UCCS merchant database. The central computer system downloads the merchant database and initiates a debit electronic fund transfer to the merchant's bank for an amount equal to the charitable contribution. The central computer system then collates data from different merchants for the same charity and initiates a credit electronic fund transfer to the charity's bank for an amount equal to the total of charitable contributions from different merchants.

The functions of debiting the merchant's bank and crediting the charity's bank may be performed once a month, or once every three months, or once every six months or once every year depending upon the volume of transactions and or the size of the charitable contributions.

The UCCS central computer system preferably has an interface function, using internet, enabling a charity to input the charity and customer-benefactor identification data into the central computer system. It also has a function enabling charity's status authentication, a function creating and printing Universal Charity Cards and an accounting statement function generating statements to the merchant, charity and customer-benefactor.

The central computer system, preferably may have yet another interface function, using internet, enabling a customer-benefactor to input customer-benefactor data and data on multiple charities with percent split among the charities. The customer-benefactor may also input one charity with a specific charitable cause or multiple charitable causes and percent split among the multiple charitable causes of a single charity.

The interface function of the central computer may utilize internet means or may be via telephone or may be via a person who receives this information and enters the information into the central computer system.

The UCCS by using a UCC, UCCS merchant software and UCCS central computer software seamlessly and effortlessly facilitates the efforts of the three parties involved, the merchant, the charity and the customer-benefactor.

DRAWINGS

These and other features, aspects and advantages of the present invention will become better understood with regard to the following description, appended claims and accompanying drawings where:

FIG. 3A is a version of UCCS merchant database

FIG. 4A is a version of UCCS central computer database

DESCRIPTION

Figure 1:
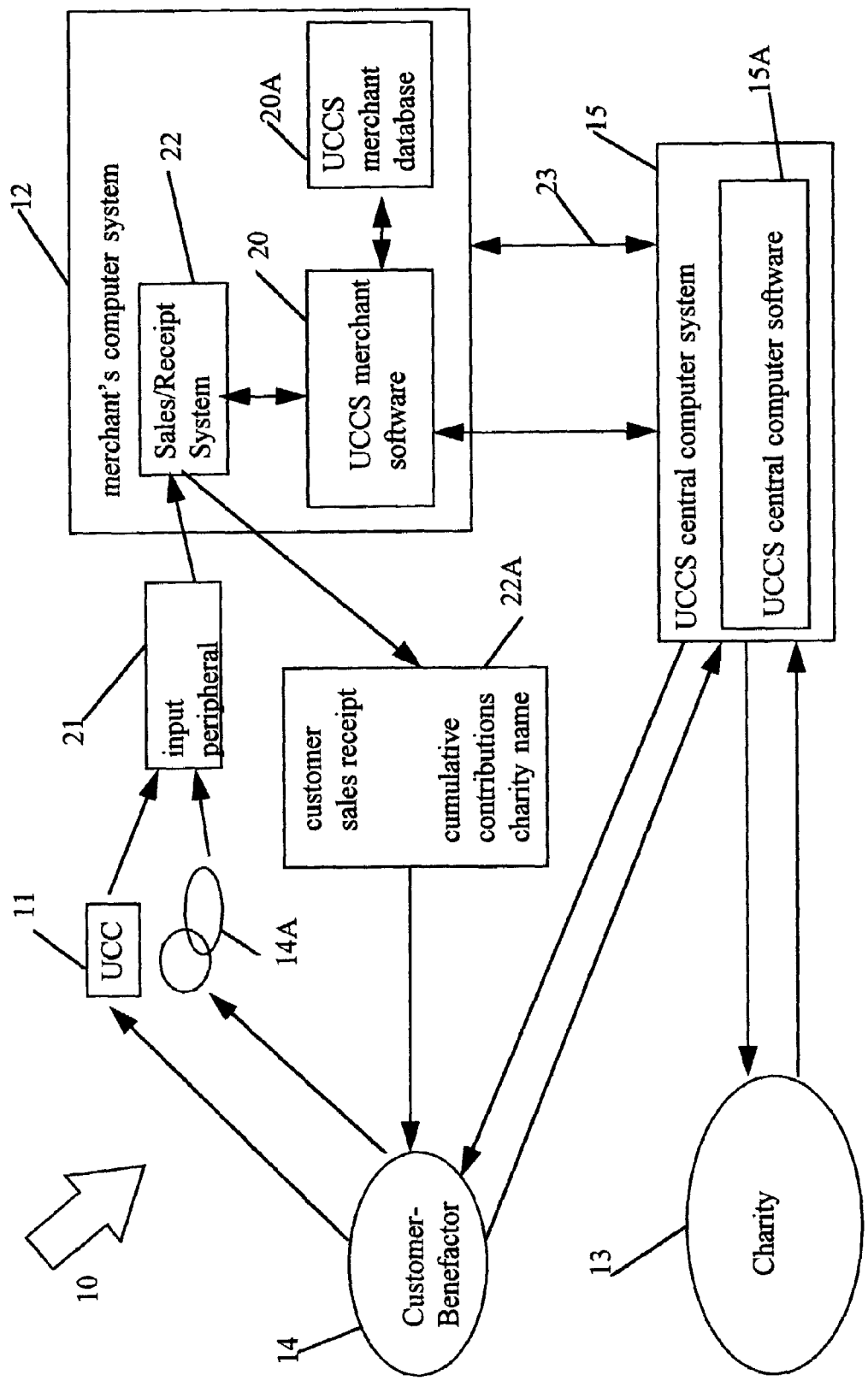
FIG. 1 is a version of system block diagram of Universal Charity Card System.

A universal charity card system (10) has a universal charity card(11), a merchant with a merchant computer system (12), a charity (13) and a customer-benefactor (14), who is a customer of the merchant and purchases goods (14A) and wishes to benefit the charity. The universal charity card system, preferably has a central computer system(15).

The UCCS merchant computer system (12) may be an existing computer system with UCCS merchant software (20) and UCCS merchant database (20A) in it. The UCCS merchant computer system has an input peripheral device (21) for a barcode and or magnetic code, a sales/receipt software (22) which prints customer sales receipt (22A), a Universal Charity Card System (UCCS) merchant software (20) and preferably an electronic link (23) to the UCCS central computer system (15).

Figure 2:
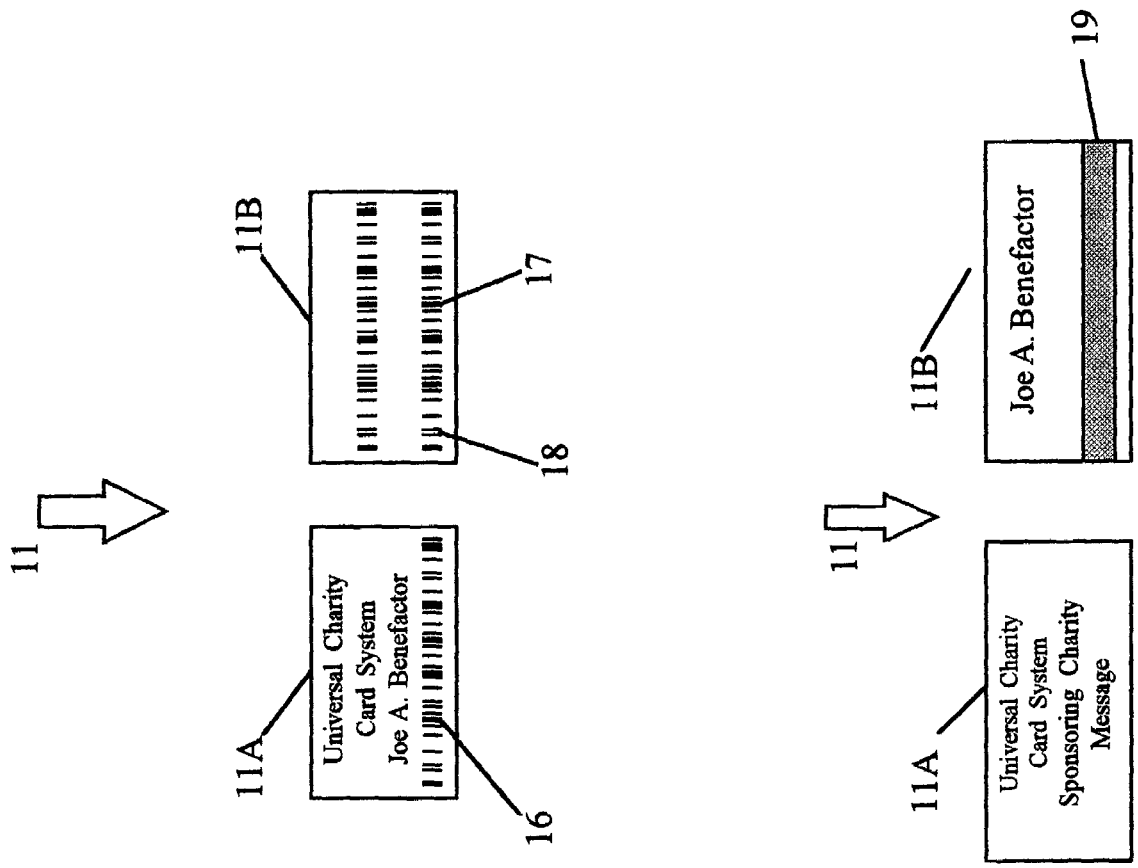
FIG. 2A is a version of Universal Charity Card.
FIG. 2B is another version of Universal Charity Card.

With reference to FIG. 2, the universal charity card (11) is a card with two sides, side 1 (11A) and side 2 (11B). The customer-benefactor's identification (16) is bar-coded on side 1 and the charity's identification bar-coded on side 2 of the card (17). The customer-benefactor identification is, preferably bar coded on one side and the charity identification is bar-coded on the other side of the card, where a plurality of charities may be bar-coded along with percent split of charitable contribution among the plurality of charities (18). A charity with a specific charitable cause or a charity with multiple charitable causes with percent split among the causes may be coded. For example, in a school district charity, parents of children attending a specific school may want their contributions to go towards that specific school.

The coding on the UCC may be by magnetic means on a magnetic strip on the card (19). Both the bar-coding and magnetic coding are existing technologies in wide use. It is conceivable that some merchants use bar coding and some magnetic coding only input peripheral devices. A UCC may have both bar-coding and magnetic coding on it.

Figure 3:
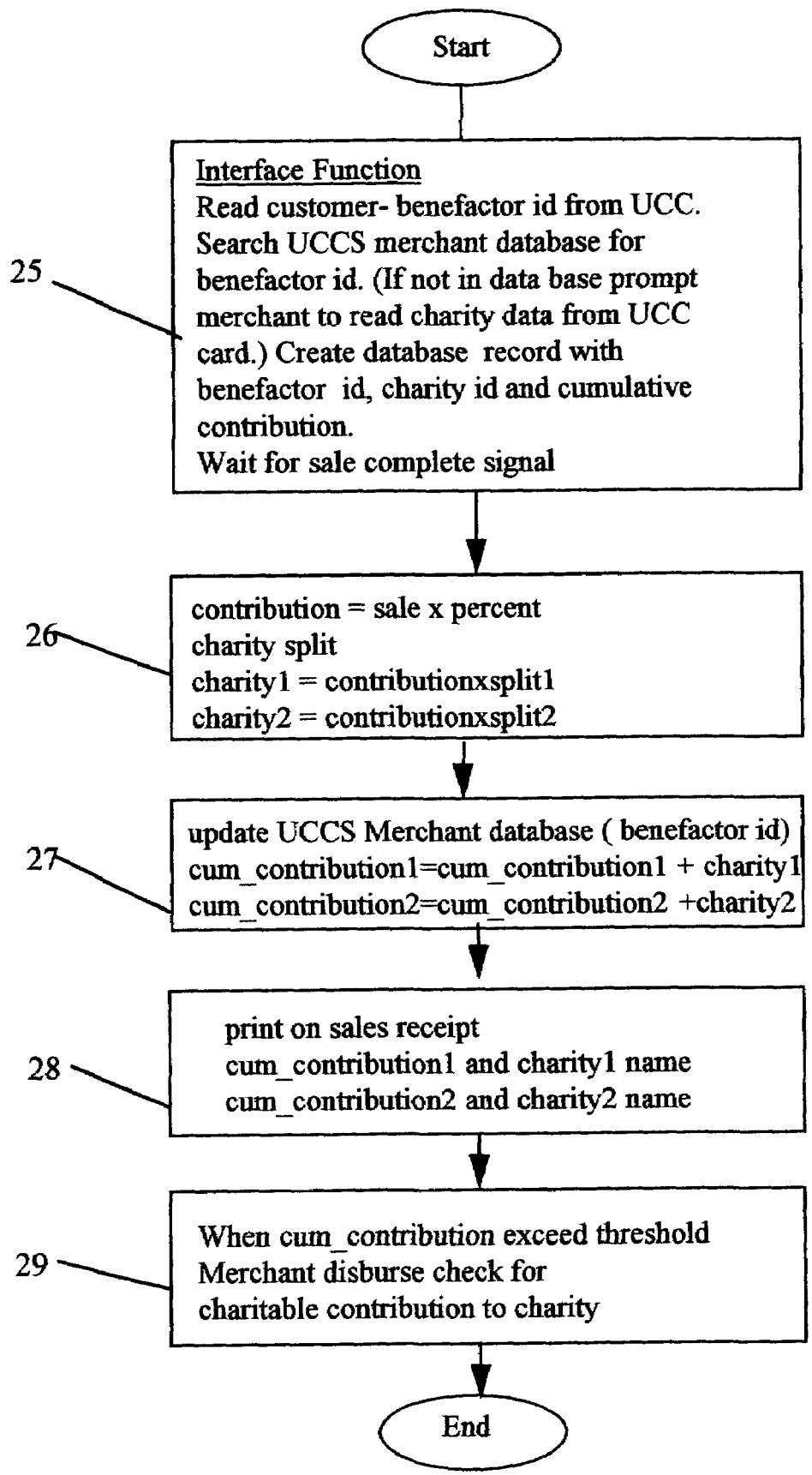
FIG. 3 is a version of Universal Charity Card System's merchant software functions.

With reference to FIG. 3, The UCCS merchant software (20) has the function of: an interface function to merchant's sales/receipt system transferring UCC data and current total sale to the UCCS merchant software (25). The customer-benefactor identification read from the UCC is searched within the UCCS merchant database, and if a record does not exist, the merchant computer system prompts the merchant to read in the other side of the UCC card which has information on charity and a new database record for the customer-benefactor for the charities is created in the UCCS merchant database. If a magnetically encoded UCC is used which has all the information on a magnetic strip, the step of reading the other side of UCC may not be necessary. The Interface function waits for a sale complete signal from the sale/receipt software before proceeding to the next function.

The UCCS merchant software also functions of: computing charitable contribution as a percent of current sale and splitting among multiple charities or charitable causes of a single charity(26); a function of updating a merchant database with customer-benefactor identification, charity identification and cumulative charitable contributions (27); and a function of printing charity name and cumulative charitable contribution on the current sales receipt (28).

FIG. 3A shows a UCCS merchant database showing the essential database elements. The UCCS merchant software also may have a function that disburses funds to the charity for cumulative charitable contributions (29).

Figure 4:
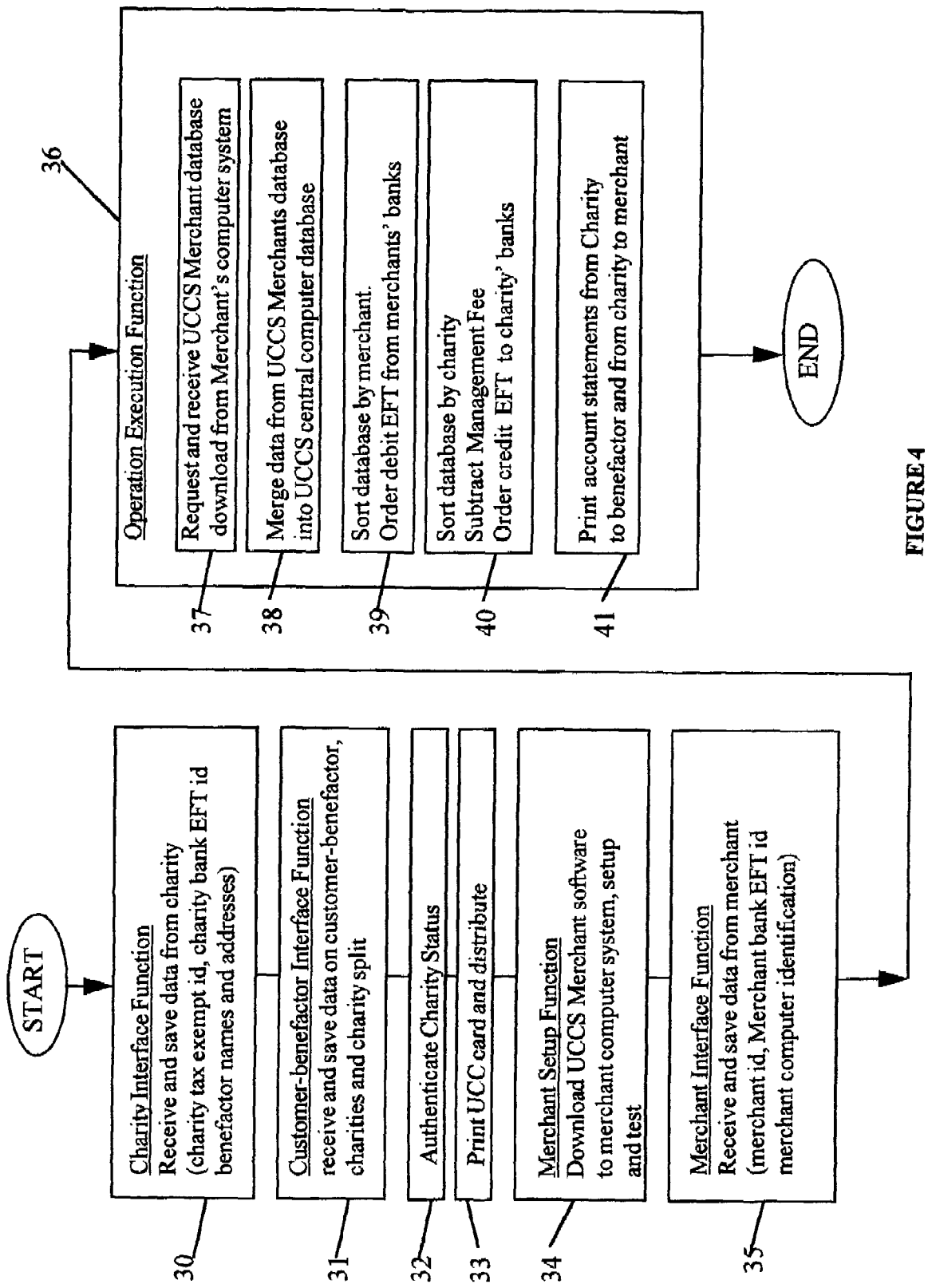
FIG. 4 is a version of Universal Charity Card System's central computer software functions.

With reference to FIGS. 1 and 4, the UCCS Central computer system (15) has a UCCS central computer software (15A) which has the following functions.

A Charity interface function (30), which receives and saves data from the charity such as charity's tax exemption status and identification, charity's bank identification for electronic fund transfer (EFT) and customer-benefactor identification in the form of names and addresses.

A customer-benefactor interface function (31) which can receive and save data from a customer-benefactor on one or more charities, percent split contribution among charities, or percent split contribution among one or more causes with in a single charity.

A charity status authentication function (32) an a universal charity card printing function (33). The charity status authentication function may involve an automated or manual interface with the Internal Revenue Service to verify the tax exempt status of the charity. After printing, the UCC cards may be mailed to the charity for distribution to the customer-benefactors or they may be mailed directly to the customer-benefactors.

A merchant setup function (34) that downloads the UCCS merchant software package to the merchant computer system, enables its installation, set up and test. A merchant interface function (35) which receives data from merchant that may include merchant identification, merchant's bank electronic funds transfer identification merchant computer system identification.

An operation execution function (36) which has the sub functions of requesting and receiving UCCS merchant database download (37), merging data from the merchant data base into a UCCS central computer database (38), sorting the central computer database by merchant so that a debit electronic fund transfer order is issued to the merchant's bank (39), and sorting the central computer data base by charity so that a credit electronic fund transfer order is issued to the charity's bank (40). A management and or processing fee may be subtracted from the charitable funds distributed to the charity (40). There is also a sub-function of printing accounting statements to the customer-benefactor and the merchant (41)

FIG. 4A shows the UCCS central computer data base showing the essential database elements.

The interface functions of the UCCS central computer system and the UCCS central computer software with the charity, the merchant and the customer-benefactor may utilize internet means or may be via telephone either automated or via a person. The internet and telephone technology are existing technologies in widespread use for such interface functions.

Although the present invention has been described in considerable detail with respect to certain preferred versions thereof, other versions are possible. Therefore, the spirit and scope of the appended claims should not be limited to the descriptions of the preferred versions contained herein.

Therefore, I claim:

1. A charity system facilitating contributions from a merchant to a charitable entity comprising:
    a. first means for making available a charity card with encoded charity identification to a select group of public desiring to benefit the entity;
    b. second means for a merchant computer system with a sale terminal, on being presented the charity card, reading the encoded charity card, computing a contribution by multiplying a sale amount and a percent of sale and allocating the contribution to the entity, wherein the merchant will contribute to the entity the percent of sales of the merchant to the select group;
c. third means for aggregating the allocated contributions from a plurality of sale transactions with the select group and sending the aggregate contributions to the entity.

2. The charity system as in claim 1, wherein the first means comprising:
a. means for members of the select group registering into the charity system;
b. means for the charity system printing the charity card identifying the entity by an encoding means and mailing the charity cards to members of the select group.

3. The charity system as in claim 1, wherein the first means comprising:
a. means for reaistering the entity and members of the select group into the charity system;
b. means for the charity system printing the charity card identifying the entity and the members of the select group by an encoding means and mailing the charity cards to the entity for distribution to the select group.

4. The charity system as in claim 1, wherein the second means comprising:
means for the merchant sale terminal printing a sales receipt identifying the entity and the contribution to the entity from the sale transaction.

5. The charity system as in claim as in 1, wherein the second means comprising:
means for the merchant sales terminal printing a sales receipt identifying the entity, the contribution to the entity from this sale transaction, and the cumulative contributions from prior sales transactions.

6. The charity system as in claim 1, wherein the third means comprising:
a. means for collecting contributions from a plurality of merchants allocated to plurality of entities;
b. means for aggregating contributions for entity and performing one electronic fund transfer to entity bank.

7. The charity system as in claim as in 6, further comprising: means for preparing and sending the entity an accounting statement, identifying the merchant and the contribution from the merchant.

8. The charity system as in claim as in 6, further comprising: means for preparing and sending to the merchant an accounting statement, identifying each of the entities and the contribution from the merchant.

9. A charity system facilitating contributions from a merchant to a charitable entity comprising:
a. a first function for receiving and storing entity data of entities willing to influence a select group of public to patronize merchants who are willing to contribute a percent of their sales to the entities';
b. a second function for receiving and storing data of members of the select group desiring to patronize the merchants willing to contribute to the entities;
c. a third function printing and mailing a charity card encoded with charity identification and member identification to the members of the select group;
d. a fourth function in a merchant computer system with a sale terminal enabling reading the charity card and computing a contribution by multiplying a sale amount and a percent of sale and storing
said contribution data identified by entity identification and member identification into a merchant database.

10. The charity system as in claim 9, further comprising:
a. a fifth function reading the merchant databases from a plurality of merchants and aggregating the contributions to the entity by the merchants;
b. a sixth function performing a fund transfer of aggregate contributions from the merchants to the entities.

11. The charity system as in claim 9, wherein the second function comprising:
receiving and storing a plurality of charitable entity identifications and percent split of contributions between the plurality of charitable entities.

12. The charity system as in claim 11, wherein the charity card additionally encoded with a plurality of entity identifications along with the percent split of contributions.

13. The charity system as in claim 12, wherein the fourth function comprising:
splitting the contribution among the plurality of entities and storing said contribution data in the merchant database.

14. The charity system as in claim 13, wherein the fourth function comprising:
a sub-function that prints on a sales receipt the entities and the contributions to the entities from the sale transaction.

15. The charity system as in claim 9, wherein the fourth function comprising:
a sub-function that prints on a sales receipt the entity and the contribution to the entity from the sale transaction.

16. The charity system as in claim 9, wherein the fourth function comprising:
a sub-function that prints on a sales receipt the contribution to the entity from this sate transaction and cumulative contribution from prior sales transactions.

17. A method facilitating contributions from a merchant to a charitable entity comprising the steps of:
a. making available to a select group of public desiring to benefit the entity a charity card with encoded entity identification;
b. receiving by the merchant at a merchant computer system with a sale terminal the charity card by members of the select group; and
c. reading by the merchant sale terminal of the charity card, computing a contribution by multiplying a sale amount and a percent of sale and allocating the contribution to the entity, wherein the merchant will contribute to the entity the percent of sales of the merchant to the select group.

18. The method as in claim 17, comprising the step of:
aggregating by the merchant the allocated contributions from a plurality of sale transactions and sending the contributions to the entity.

19. The method as in claim 17, comprising the steps of:
a. registering by the entity and members of the select group into a universal charity card system;
b. printing by the system, the card identifying the entity and the members of the select group by an encoding means and mailing the charity cards to the entity for distribution to the select group.

20. The method as in claim 19, comprising the step of:
printing by the system, the charity card identifying the entity and a member of the select group by an encoding means and mailing the charity cards to the members of the select group.

21. The method as in claim 17 comprising the steps of:
a. registering by the entity itself into a universal charity card system; and b. notifying by the entity of the select group to obtain from the system the charity card identifying the entity and a member of the select group.

22. The method as in claim 17, comprising steps of:
a. collecting contributions by the system from a plurality of merchants allocated to plurality of entities;
b. aggregating by the system contributions for the entity and performing one fund transfer to an entity bank.

23. The method as in claim 22, comprising the step of: preparing and sending by the system to the entity an accounting statement, identifying the merchant and the contribution from the merchant.

24. The method as in claim 22, comprising the step of: preparing and sending by the system to the members of the select group of public an accounting statement identifying the charity and the contribution from the select member purchases from the merchant.

25. The method as in claim 22, comprising the step of: preparing and sending by the system to the merchant an accounting statement, identifying each of the entities and the contribution from the merchant.

26. The method as in claim 17, comprising the step of: printing by the merchant sale terminal a sales receipt identifying the contribution to the entity from the sale transaction.

27. The method as in claim 17, comprising the step of: printing by the merchant sales terminal a sales receipt identifying the contribution to the entity from this sale transaction, and the cumulative contributions from prior sales transactions.

28. A merchant participating in a charity system, wherein the merchant contributes to a charitable entity a contribution computed by multiplying a sale amount and a percent of the sale, a sales receipt printed by a merchant sales terminal wherein the sales receipt comprising: on the face of the sales receipt, identification of the charitable entity along with an amount of contribution to the entity by the merchant.

29. The claim as in 28, wherein the identification of a charitable entity comprising:

identification of at least one charitable cause.

30. The claim as in 28, wherein the amount of contribution comprises: an amount of contribution from a present sales transaction and an amount of contribution from prior sales transactions.

* * * * *